United States Patent
Spittle et al.

(10) Patent No.: US 8,601,981 B2
(45) Date of Patent: Dec. 10, 2013

(54) ANIMAL LITTER

(75) Inventors: Kevin S. Spittle, Vero Beach, FL (US); James D. Tanner, Northbrook, IL (US)

(73) Assignee: Profile Products L.L.C., Buffalo Grove, IL (US)

( * ) Notice: Subject to any disclaimer, the term of this patent is extended or adjusted under 35 U.S.C. 154(b) by 189 days.

(21) Appl. No.: 12/561,393

(22) Filed: Sep. 17, 2009

(65) Prior Publication Data

US 2010/0006035 A1    Jan. 14, 2010

Related U.S. Application Data

(63) Continuation-in-part of application No. 12/015,583, filed on Jan. 17, 2008.

(60) Provisional application No. 60/885,449, filed on Jan. 18, 2007.

(51) Int. Cl.
A01K 29/00    (2006.01)

(52) U.S. Cl.
USPC .......................................... 119/172; 119/173

(58) Field of Classification Search
USPC ................... 119/171, 173, 161, 172
See application file for complete search history.

(56) References Cited

U.S. PATENT DOCUMENTS

| | | | |
|---|---|---|---|
| 2,935,471 A | 5/1960 | Aarons et al. | |
| 4,311,115 A | 1/1982 | Litzinger | |
| 5,100,600 A | 3/1992 | Keller et al. | |
| 5,888,345 A | 3/1999 | Knapick et al. | |
| 5,975,019 A * | 11/1999 | Goss et al. | 119/173 |
| 6,158,167 A | 12/2000 | Spittle | |
| 6,287,550 B1 | 9/2001 | Trinh et al. | |
| 6,635,344 B1 | 10/2003 | de Almeida et al. | |
| 6,895,896 B1 | 5/2005 | Bloomer | |
| 7,124,710 B2 | 10/2006 | Weaver | |
| 7,163,737 B2 | 1/2007 | De Almeida et al. | |
| 7,343,874 B2 | 3/2008 | DeLeeuw et al. | |
| 7,387,084 B2 | 6/2008 | Hildenbrand et al. | |
| 7,429,421 B2 | 9/2008 | Greene et al. | |
| 2004/0079293 A1 | 4/2004 | Rasner et al. | |
| 2004/0103852 A1 | 6/2004 | Schulein, Jr. et al. | |
| 2004/0112297 A1 | 6/2004 | Rasner et al. | |
| 2005/0145186 A1 | 7/2005 | Fung et al. | |
| 2005/0160996 A1 | 7/2005 | Weaver | |
| 2005/0160997 A1 * | 7/2005 | Weaver | 119/171 |
| 2006/0201438 A1 | 9/2006 | Anttila et al. | |
| 2007/0012259 A1 | 1/2007 | Ellis | |
| 2007/0017453 A1 * | 1/2007 | Fritter et al. | 119/173 |
| 2007/0289543 A1 | 12/2007 | Petska et al. | |
| 2008/0022939 A1 | 1/2008 | Bracilovic | |
| 2009/0000562 A1 | 1/2009 | Jenkins et al. | |

OTHER PUBLICATIONS

U.S. Appl. No. 60/805,007, filed Jun. 16, 2006 by Petska et a.*

* cited by examiner

*Primary Examiner* — T. Nguyen
(74) *Attorney, Agent, or Firm* — Brooks Kushman P.C.

(57) ABSTRACT

An animal litter with increased moisture retention and accelerated absorbency, a method of manufacture and method of use for indoor urine and feces disposal. An animal litter with a greater surface area and higher moisture retention intended for animals as small as mice, gerbils and hamsters, as well as larger domestic animals. The animal litter is a paper and wood composition treated with a surfactant, which increases moisture retention four to five times its weight.

24 Claims, 1 Drawing Sheet

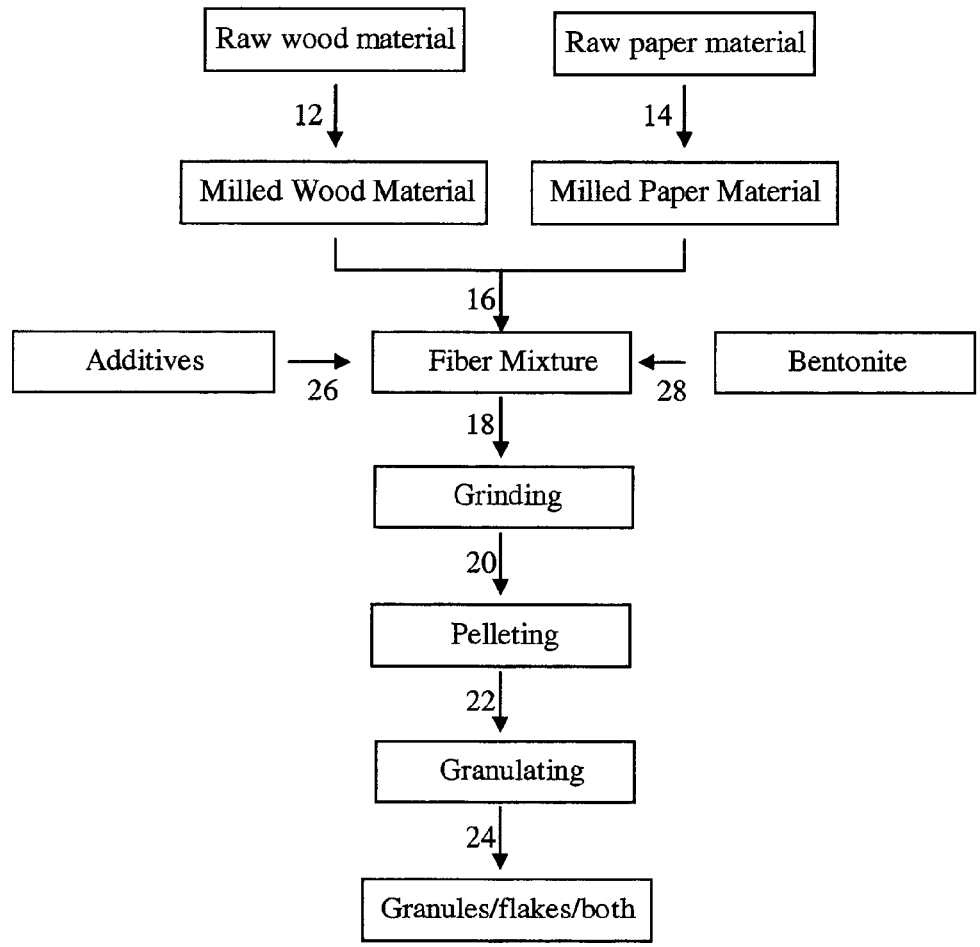

ANIMAL LITTER

CROSS-REFERENCE TO RELATED APPLICATIONS

This application is a continuation-in-part of U.S. application Ser. No. 12/015,583 filed Jan. 17, 2008 which, in turn, claims the benefit of U.S. Provisional Application Ser. No. 60/885,449 filed Jan. 18, 2007, now expired.

BACKGROUND OF THE INVENTION

1. Field of the Invention

The invention relates to an animal litter with increased moisture retention and accelerated absorbency, a method of manufacture and method of use for indoor urine and feces disposal.

2. Background Art

Animal litter is typically used for indoor urine and feces disposal to simulate the natural instincts of animals to excrete in soft soil for easy burial. The litter is generally composed of clay, recycled paper, or silicate-based granular material. A deodorant or fragrance may be added to mask the odor of the urine and feces.

Small animals kept in cages such as mice, hamsters and gerbils require frequent changes of the litter to keep cages clean and sanitary. Laboratory animals also require a non-toxic litter to reduce the effect of the environment on animal testing. Many animal litters are not biodegradable and they are difficult to dispose of by flushing the litter down the toilet. Alternatively, the amount of litter disposed of in landfills leads to an enormous amount of waste that is not biodegradable.

There is a need to produce an animal litter material which is more highly absorbent. Additives have been used to improve moisture retention and increase the time between changes of the animal litter. However, these additives frequently increase the cost of the litter material, and are not always as effective as desired for their intended purpose. There is also a need to have an animal litter that is biodegradable, does not clog toilets and reduces the amount of non-degradable waste in landfills.

SUMMARY OF THE INVENTION

The present invention provides a composition for an animal litter with a greater surface area, composed of paper and wood. This composition is treated with a surfactant which provides a composition with the ability to retain moisture in amounts of up to approximately four to five times its weight. The composition may also contain additional ingredients for odor and moisture control, dyes, pigments, and the like. It is further an object of the invention to provide a method of manufacturing the animal litter, and processes for use as litter in collecting urine and/or feces of animals.

BRIEF DESCRIPTION OF THE DRAWINGS

FIG. 1 depicts a process flowchart for forming a clumping litter composition according to one or more embodiments of the present invention.

DETAILED DESCRIPTION OF THE PREFERRED EMBODIMENT

In one embodiment of an animal litter, the product comprises finely-divided paper, and/or finely-divided wood, and a surfactant. The finely-divided paper and wood are liquid absorbent in and of themselves. The addition of a surfactant increases the liquid retention properties of the paper and wood particles, and also speeds liquid absorption. It can increase the absorption approximately four to five times the weight of the animal litter.

In one variation, the animal litter includes: approximately 60% to 85% by weight of finely-divided paper, more preferably 70% to 85%; approximately 15% to 40% by weight of finely-divided wood, more preferably 15% to 30%; approximately 0.1% to 1.0% of a deodorizer, preferably 0.5% by weight; and approximately 0.1% to 0.5% by weight of a surfactant, the percentages totaling 100% by weight. A highly preferred embodiment utilizes approximately 80%+/−2% by weight of finely-divided paper, approximately 20%+/−2% by weight of finely-divided wood, approximately 0.5% by weight of the deodorizer, sodium bicarbonate, and approximately 0.2% by weight of the surfactant, polyoxyalkylene glycol, to prepare an animal litter with high moisture retention properties. In another variation, the pH of the resulting animal litter should be adjusted to be slightly acidic between (pH 3.5 and 5.5) to control the amount of ammonia gas and hence odor released from urine absorbed by the animal litter. Choice of weak acids to adjust the pH must be balanced with compatibility with the surfactant and deodorant utilized in the animal litter. In the inventive compositions, each integral percentage of each ingredient between the broadest end points of that ingredient is considered as fully disclosed herein, and part of the disclosed invention.

The method of manufacturing described produces a softer animal litter than those containing coarser materials such as clay. Research has shown that smaller animals prefer finely granulated litters, presumably because they have a softer feel. Larger animals such as rats, rabbits and guinea pigs prefer a slightly larger granulated litter. Softer animal litters are also preferred by the laboratory animal management industry for use with automated bedding dispensers.

Additionally, an animal litter composition with an increased rate of absorbency is a preferred factor in reducing the number of litter changes and reduces the amount of animal waste which passes to the bottom of the animal housing unit.

The method of manufacturing is similar to U.S. Pat. No. 6,158,167 for "Mulch Flakes" herein expressly incorporated by reference which are a paper and wood-based material treated with a surfactant and mixed with a liquid to produce a slurry capable of use in hydro-mulching tanks to be sprayed on the ground.

An appropriate concentration of a deodorizer and additional organic or synthetic absorbent materials may be included to control odors and reduce moisture. Such fragrances and deodorants are well known to those skilled in the art. Examples may be found in U.S. Pat. Nos. 5,100,600; 5,888,345; 6,635,344; and 7,163,737, all herein incorporated by reference. In addition, dyes and pigments may be added to produce an aesthetically pleasing color, or a color which may influence an animal's decision to use the litter. Neutralizing substances such as calcium carbonate or magnesium carbonate may also be added.

The surfactants used may be any which promote the wetting of the paper and wood fibers. These surfactants may be anionic, cationic, zwitterionic, or non-ionic. Examples of relatively inexpensive ionic surfactants are the alkylbenzene sulfonates and naphthalene sulfonates. Fatty acid salts may also be useful for this purpose. Preferred for use as surfactants, however, are non-ionic polyether surfactants such as polyoxyethylated, polyoxypropylated, and both polyoxyethylated and polyoxypropylated compounds having active hydrogen atoms. Other alkylene oxides can in principle be used to prepare the preferred surfactants, but are in general more expensive than those prepared from ethylene oxide and/or propylene oxide.

The oxyalkylation may be block, random (heteric), block random, or any distribution which provides the necessary wetting properties. Unless of very low molecular weight (<500 Da), surfactants prepared from higher alkylene oxides such as propylene oxide and butylene oxide have little if any wetting action. Reference may be had to NONIONIC SURFACTANTS, Martin Schick, ed., Marcel Dekker (1987) for suitable wetting action. Examples include: polyoxyethylated aliphatic alcohols, phenol, alkylphenols, glycols, glycerine, etc. Nonylphenol ethoxylates and block polyoxyalkylene polyethers having at least one hydrophobic moiety and one hydrophilic moiety are preferred. In principle, surfactants such as polyoxyalkylene polysiloxane copolymers are also useful, but these tend to be more expensive. Surfactants containing glycosidyl radicals and polyglycosidyl radicals are also suitable.

Tests for suitable surfactants and the amount required are readily made by preparing a surfactant-free litter product, adding the surfactant being tested, neat, as a suspension or dispersion, or dissolved in suitable solvent (preferably water, lower alcohols, acetones, or mixtures thereof), the surfactant-containing litter is dried, and tested as such or after being compressed to a felt-like product. A known weight of water is added and the time to its complete absorption measured. Surfactants with different wetting abilities can easily be compared by this method.

The animal litter of the preferred embodiment for small animals may be produced as follows: Recycled newspapers are shredded and processed through a hammer mill or similar equipment. The resulting paper pieces are next introduced into a finish hammer mill or similar equipment. Additionally, an appropriate amount of sawdust is added to the finish hammer mill. The approximate sizes of the components to be added to the finish hammer mill may include: Paper approximately ¼ to 1½ inches in length, and sawdust passed through a 20-mesh screen. A liquid surfactant, for example, a polyoxyalkylene glycol, and a fragrance or deodorant may be included in the correct proportion to the mixture of solids. The resultant mixture is granulated to produce the animal litter product. The finished product is processed to select the desired finely granulated litter. The various components are predominantly present as an intimate mixture in the granules thus formed. A simple mixture of finely divided paper and wood fiber is not suitable for use as a litter product.

Domestic animals, particularly cats, are typically trained to urinate and defecate in a specially provided litter box. Absorbent materials are applied to the litter box to collect the urine and feces (i.e., dross). A major problem with the absorbent materials is that after a relatively short period of time, the soiled absorbent materials emit objectionable odors due to the presence of the urine and fecal matter.

In order to reduce or eliminate these objectionable odors, fecal matter must be periodically removed from the absorbent materials. However, physical removal of the fecal matters does not reduce or eliminate odors caused by the urine absorbed into the absorbent. The homeowner must then wash the litter box and refill it with fresh absorbent material. These activities are, however, unpleasant, time-consuming and expensive.

Litters have subsequently been developed that allow the homeowner to scoop portions of litter that have absorbed the urine, thus removing one of the primary sources of odor. Various clays have been used as a base material for absorbent animal litters for some time. These materials become tacky when wetted, thereby forming a "clump" that is easily removed when cleaning a litter box. Many animals, cats in particular, will often refuse to use a litter box that is not kept scrupulously clean. Clumping animal litters facilitate ease of cleaning since otherwise the litter box must be periodically dumped and refilled to maintain appropriate cleanliness. However, conventional clumping litters have been met with limited use as they tend to break, disintegrate, create dust, or crumble, and therefore result in consumer dissatisfaction.

In another embodiment of the animal litter, the litter includes (a) a milled wood material, (b) a milled paper material, and (c) a bentonite wherein components (a), (b) and (c) are intermixed together to form an admixture and the admixture is pelletized, granulated, and/or flaked to provide granules, pellets and/or flakes.

In yet another embodiment of the animal litter, the litter includes a milled paper material intermixed with a bentonite and configured as granules, flakes, or both. In this embodiment, the litter does not contain any wood material to reduce bulk density. In one variation, the litter can further include guar gum to provide additional clumping effect and at the meantime, increase the organic content of the resultant litter. In certain instances, the milled paper material includes shredded newspaper, or particularly shredded recycled newspaper to further reduce cost.

The milled paper material, or together with the milled wood material, should be provided in an amount of 40 to 75 percent, 45 to 70 percent, or particularly 50 to 60 percent by weight, of the total weight of the animal litter.

In certain instances, the animal litter, when configured as granules, is provided with a density of from 16 to 24 lbs/ft$^3$, of from 18 to 22 lbs/ft$^3$, or particularly 20 lbs/ft$^3$. In certain other instances, the animal litter is provided as granules such that at least 90 percent by weight of the animal litter flakes have a size of from 0.5 to 6 mm, or 1 to 5 mm, or particularly 2 to 4 mm in the longest dimension. When the litter granules are further divided or granulated to form flakes, the resultant litter is provided with reduced bulk density and increased volume-to-weight ratio.

In certain instances, the animal litter, when configured as flakes, is provided with a density of from 14.5 to 17.5 pounds per cubic feet (lbs/ft$^3$), of from 15.0 to 17.0 lbs/ft$^3$ lbs/ft$^3$, or 15.5 to 16.5 lbs/ft$^3$. In certain other instances, the animal litter is provided as flakes such that at least 90 percent by weight of the animal litter flakes have a size of from 4.2 to 9.5 millimeters (mm) in the longest dimension. In certain other instance, the animal litter is provided as flakes such that at least 90 percent by weight of the animal litter flakes have a thickness of from 3.2 to 6.4 mm.

The milled wood material, according to one or more embodiments of the present invention, can be sawdust, wood shavings, or de-fibered wood material. The milled wood material can be provided with a length ranging from 0.5 mm in the case of sawdust to 50 mm in the case for fibrous fibers and any length in between is also suitable dependent upon the particular application at hand. When used as the milled wood material, the fibrous fibers can be provided with a fiber diameter of from 100 to 1000 microns, 200 to 800 microns, or particularly 500 microns.

The milled paper material, according to one or more embodiments of the present invention, can be provided with a size in length ranging from 0.5 mm in the case of highly processed, finely divided short fibers to 20 mm in the case of shredded paper pieces. Any length in between is also suitable dependent upon the particular application at hand.

Several benefits can be realized with the clumping litter composition described herein. By intermixing the bentonite with the milled wood and paper materials, the bentonite is intimately compounded into and impregnated within the fibers of the wood and paper materials, such that the clumping effect of the bentonite can be realized throughout the volume of each granule or flake of the final litter product. Thus, the bentonite penetrates into the core of each litter granule or flake, an as a result, accidental breakage or disintegration of a wetted clump can be effectively reduced.

Unlike related art materials that comprise a substrate and a coating that provides clumping action, the clumping litter composition according to one or more embodiments of the present invention utilizes an intimate mix of milled wood and paper materials and bentonite to form a uniformly mixed litter product. No separate coating is used thereby reducing the manufacturing cost. Further, in certain instances, the litter composition includes more than 50% by weight recycled paper and wood fibers, further reducing the product cost given the very low cost of these fibers from lumber mills and the like. In certain other instances, the litter composition is configured as granulates and/or flakes enhance surface area and hence moisture absorption.

Bentonite has been conventionally used alone as the base absorbent of a litter composition. This conventional use comes with issues as bentonite, when used alone, tends to aggressively stick to the sides and bottom of a litter box when wetted. This tendency makes removal of the clumped litter more difficult, sometimes partially defeating the purpose of the clumping action afforded by the bentonite. Litter stuck to the sides and bottom of the litter box also requires more frequent replacement of the litter box itself. This problem has been effectively dealt with according to one or more embodiments of the present invention, wherein the litter composition results in softer clumps with wetness penetrating throughout each of the clumps that stick together sufficient for relatively easy removal.

The litter composition containing the paper and wood fibers intermixed with bentonite, according to one or more embodiments of the present invention, is provided with a desirable volume/weight ratio due to the general lightweight of the paper and wood fibers and is concurrently provided with a desirable dumping benefit as a result of intimate interactions between the fiber materials and the bentonite.

As the bentonite is intimately mixed with the other components of the animal litter composition, the clumping effect of the bentonite is maximized per a given amount. Therefore, relatively less amount of bentonite can be used, and hence more cost benefits can be realized as bentonite is in general quite expensive.

In another embodiment, the clumping litter composition further includes at least one colorant agent. The colorant agent includes dyes, including, but not limited to, direct dyes, vat dyes, sulfur dyes, acid dyes, mordant acid dyes, premetalized acid dyes, basic dyes, dispersed dyes, reactive dyes, azo dyes, phthalocyanine dyes, anthraquinone dye, quinoline dyes, monoazo, disazo and polyazo dyes. The colorant agent can also include one or more pigments which selectively reflect and absorb certain wavelengths of light. The reflected light spectrum creates the appearance of a color. Sunlight creates a more uniform spectrum than artificial light. There are many pigment groups which may be combined to form specific colors. Some pigment groups are more compatible than others which increases or decreases the intensity of the color. The pigments can be selected from the pigment groups consisting of: arsenic pigments, carbon pigments, cadmium pigments, iron oxide pigments, chromium pigments, cobalt pigments, lead pigments, copper pigments, titanium pigments, ultramarine pigments, mercury pigments, zinc pigments, clay earth pigments (which include iron oxides), pigments of biological origin, and combinations thereof.

When used, the colorant agent is provided up to approximately 0.01 percent to 5 percent by weight of the litter composition, 0.1 percent to 3 percent by weight of the litter composition, 0.5 percent to 2 percent by weight of the litter composition, or about 1 percent by weight of the litter composition.

In yet another embodiment, the litter composition further includes an odor control agent. The odor control agent includes an anti-bacterial agent, an odor control enzyme, an odor control boron compound, or combinations thereof. One class of anti-bacterial or odor control agents is transition metal ions and their soluble salts. Particular transition metals include silver, copper, zinc, ferric and aluminum salts. More particularly, the transition metal includes zinc. Examples of the odor control enzymes include ureases and proteases, such as pepsin, tripsin, ficin, bromelin, papain, rennin, and mixtures thereof. Examples of the odor control boron compounds include borax pentahydrate, borax decahydrate and boric acid. Polyborate, tetraboric acid, sodium metaborate and other forms of boron are also appropriate alternative materials.

Other odor control agents include sulfuric acid, phosphoric acid, hydroxamic acid, thiourea, iodophores, 3-isothiazolones, salts of phytic acid, plant extracts, pine oil, naturally occurring acids and antimicrobials, such as quaternary ammonium compounds, organic sulfur compounds, halogenated phenols, hexachlorophene, 2,4,4'-trichloro-2'-hydroxydiphenyl ether, trichiorocarbanalide, 2,4-dichloro-meta-xylenol, 3,4,5-tribromosalicylanalide, 3,5,3',4'-tetrachlorosalicylanalide, and mixtures thereof. Additional odor control (or odor-absorbing) agents include carbonates, bicarbonates, cyclodextrins, zeolites, activated carbon, kieselguhr, chelating agents, chitin and pH buffered materials, such as carboxylic acids and the like.

In yet another embodiment, the litter composition further includes one or more fragrances to provide a freshness. The fragrance can be free or encapsulated to prevent premature fragrance loss to the atmosphere, as well as to avoid a strong fragrance odor which can be uncomforting to the animals. The encapsulation can be in the form of molecular encapsulation, such as the inclusion complex with cyclodextrin, coacevate microencapsulation wherein the fragrance droplet is enclosed in a solid wall material, or "cellular matrix" encapsulation wherein solid particles containing perfume droplets stably held in the cells. Fragrances can also be more crudely embedded in a matrix, such as a starch or sugar matrix. The encapsulated fragrance can be released either by moisture activation and/or a pressure activation mechanism. Moisture-activated microcapsules release fragrance upon being wetted, e.g., by the animal urine. Pressure-activated microcapsules release fragrance when the shell wall is broken by, e.g., the scratching or stepping of the animals on the litter. Some microcapsules can be activated both by moisture and pressure.

The fragrances can contain pro-fragrances. A pro-fragrance is a normally nonvolatile molecule which consists of a volatile fragrance ingredient covalently bonded to another moiety by a labile covalent bond. In use, the pro-fragrance is decomposed to release the volatile fragrance ingredient. Examples of pro-fragrances include complexes of bisulfite, with fragrance ingredients having an aldehyde or ketone functional groups, and esters of phosphoric acids, and sulfuric acids with fragrance ingredients having a hydroxyl group.

When used, the fragrance agent is provided at 0.1 percent to 3 percent by weight, particularly 0.05 percent to 2 percent by weight, and more particularly 0.1 to 1.0 percent by weight, of the litter composition.

In yet another embodiment, the litter composition further includes at least one binding agent to induce or facilitate agglomeration. Examples of the binding agent include (i) natural polymers and synthetic derivatives thereof, including, but not limited to, lignins, gums, starches and polysaccharides, such as lignin sulfonate, carboxymethylcellulose, hydroxyethylcellulose, hydroxypropylcellulose, ethylhydroxyethyl cellulose, methylhydroxypropylcellulose, guar gum, alginates, starch, xanthan gum, gum acacia, and gum Arabic, (ii) synthetic polymers, including, but not limited to, polyvinylpyrrolidone, polyethylene glycol, polyethyleneoxide, acrylate polymers and copolymers, acrylic emulsions, polyvinyl alcohol, polyvinyl acetate, polyvinyl pyrrolidine, polyacrylic acid, latexes (e.g., neoprene latex), superabsorbent polymers (e.g., cross-linked polyacrylates), flocculating agents (e.g., polycarboxylates), and fluorinated polymers (e.g., polytetrafluoroethylene), and (iii) inorganic agglomerating agents, including, but not limited to, soluble silicates and phosphates, including pyrophosphates and aluminates.

Particularly, the binding agent includes a polysaccharide gum, and more particularly a galactomannan gum. As is well known in the art, a galactomannan gum is a carbohydrate polymer containing D-galactose and D-mannose units, or other derivatives of such a polymer. Galactomannan gums include guar gum, which is the pulverized endosperm of the seed of either of two leguminous plants (*Cyamposis tetragonalobus* and *psoraloids*), locust bean gum, which is found in the endosperm of the seeds of the carob tree (*Ceratonia siliqua*), and carob gum.

One particular example of the binding agent is guar gum, which is commercially available in a wide variety of forms, including food grade and technical grade and many variations as to grind. When used without other tacking or clumping agents, guar gum is not satisfactory as a clumping agent, since the clumps formed by guar gum do not maintain integrity sufficiently for easy removal from a litter box. Clumps that break apart during removal are highly undesirable, and may defeat the purpose of using a clumping agent in the litter material entirely. In addition, when only guar gum is used as a clumping agent the percentage of guar gum by weight as a proportion of the total product must be very high in order to be effective, around 10-15% at a minimum. An advantage of guar gum, however, is that it generally does not form a barrier to moisture, swells well upon moisture contact, and therefore effectively increases liquid absorbency of the resultant litter product.

When the bentonite and guar gum are both included in the animal litter, according to one or more embodiments of the present invention, the resultant animal litter can optimize the best properties of both agents. As compared to guar gum, bentonite is less organic, less liquid absorbent, but also less expensive. By combining the bentonite and the guar gum together in the animal litter, guar gum's cost deficiency can be buffered by the inclusion of bentonite; and at the meantime, bentonite's inorganic properties can be minimized by the inclusion of guar gum such that the resultant litter is more organic in nature and hence more environmentally friendly. In one variation, the bentonite can be provided in an amount of 20 to 40 percent, 25 to 35 percent, or particularly 38 to 32 percent, by weight of the total weight of the animal litter. In another variation, the guar gum can be provided in an amount of 5 to 15 percent, 7 to 12 percent, or 9 to 11 percent, by weight of the total weight of the animal litter.

When used, the binding agent is provided at 0.01 percent to 40 percent by weight, particularly 1 percent to 30 percent by weight, and more particularly 5 percent to 20 percent by weight, of the litter composition.

In yet another embodiment, the litter composition further includes a surfactant. The surfactant can be used to increase the rate of moisture absorption. Quick absorption reduces the likelihood that the litter material will stick to the sides or bottom of the litter pan, and also makes clumps easier to remove since they will be found more near the litter surface. Quick absorption also improves the odor control exhibited by the product, since urine is quickly absorbed into the litter and odor is thereby trapped within. Several different surfactants may be used in alternative embodiments of the invention. These surfactants include T-Det N9 or T-Det NP9 from Harcros Chemicals; Standapol WAQ-LC from the Cognis Corporation; and Wickit 1362 by Hercules Corporation. The absorption rates of each of these surfactants are quite close to one another, and any may be used with the present invention with success. Alternative embodiments may comprise a combination of two or more surfactant formulations based on availability and cost considerations. In the preferred embodiment, the percentage of surfactant in the product by total product weight is in the range of 1-5%. This range is sufficient to ensure sufficient absorption qualities of the product, including sufficient absorption to allow immediate flushing of the product upon deposit in a toilet. A higher rate of surfactant usage will result in quicker absorption in the product.

According to another aspect of the present invention, a process for producing an animal litter is provided. In one embodiment, and as depicted in FIG. 1, at steps 12 and 14, raw paper material and raw wood material are respectively milled to form milled paper material and milled wood material that are finer in dimensions relative to the raw materials. In one variation, the raw paper material and the raw wood material can be optionally milled together. At step 16, the milled materials are combined and mixed to form a fiber mixture. At step 18, the fiber mixture is ground to a uniform fiber consistency. The grinding action results in an additional and simultaneous mixing of the milled materials, such that a uniform mixture may result. Notably, bentonite in powder or pellets can be added to the fiber mixture prior to the grinding at step 18. It is feasible, and depending upon particular applications at hand, the bentonite can be added at later steps such as at steps 18, 20. The other additives, including colorant agent, odor control agent, and fixing agent can be added to the fiber mixture at step 28, step 18, and or step 20, preferably at step 14 to ensure a uniform mixing.

At step 20, the ground mixture from step 18 is pelletized, optionally via an agglomeration process. Due to the thorough mixing at steps 16 and 18, the resultant pellets can have a uniform distribution of each material throughout their volume. At steps 22 and 24, the pellets are granulated and optionally flaked such that an end litter product is provided with a finer consistency and a softer texture small animals generally prefer. When the granules are further divided or granulated into flakes, the resultant litter product can be provided with increased surface area, increased volume-to-weight ratio, decreased bulk density, and hence reduced cost to the consumers.

The granulation process at step 22 and the flaking process at step 24, alone or in combination, help to reduce particle density of the final litter composition, as the previous mixing, grinding and pelletizing processes at steps 16, 18, 20 may have caused material condensing and hence material hardening.

Having generally described several embodiments of this invention, a further understanding can be obtained by reference to certain specific examples which are provided herein for purposes of illustration only and are not intended to be limiting unless otherwise specified.

EXAMPLE

Example 1

A sample litter composition, according to one embodiment of the present invention, contains the following ingredients as tabulated in Table 1. For this sample, the surfactant used is Conwet 100 and the fragrance used in Baby Powder EOC 110V16. The cellulose fiber includes fibers from newspapers and wood pieces.

TABLE 1 sample ingredients of a clumping animal litter

| Ingredients | Dry Weight Percent |
| --- | --- |
| Cellulose Fiber | 51.64% |
| Bentonite Clay | 30.00% |
| Gaur Gum | 10.00% |
| Sodium Bicarbonate | 5.00% |
| Kaolen Clay | 2.50% |
| Surfactant | 0.66% |
| Fragrance | 0.20% |

Example 2

The sample litter having ingredients tabulated in Table 1 is formed according to the following steps. The cellulose fibers including newspapers and wood pieces are hammer-milled through a screen to a consistent particle size. Bentonite, Guar gum, Kaolen clay, sodium bicarbonate are mixed with the cellulose fiber and run through a finish hammermill which further grinds the ingredients together to form a combined fiber mixture. The fiber mixture is then extruded through a pellet-forming dye. The resultant pellets are dried and then conveyed to a granulator where they can be flaked to form litter flakes.

Example 3

A small litter is shown to have the following specifications, utilizing 50 grams of finished product, as measured by a Rotap Sieve Shaker, ASTM E-11 Specification #4, #8, #16, #25, #50 and Pan:

| | |
| --- | --- |
| 25.72% | greater than 4.75 mm (range: 23% to 26%) |
| 55.90% | 4.75 mm-2.36 mm (range: 53% to 56%) |
| 11.68% | 2.36 mm-1.18 mm (range: 9% to 12%) |
| 2.33% | 1.18 mm-0.71 mm (range: 1% to 3.5%) |
| 1.27% | 0.71 mm-0.30 mm (range: 0.5% to 2%) |
| 0.10% | less than 0.3 mm (range: 0% to 0.5%) |

This animal litter may be granulated into a larger granule for larger animals. The subject invention is also directed to the use of the animal litter to receive urine and/or feces from animals. The animal litter may be packaged in bulk for laboratory use in automatic bedding dispensers. In the preferred use, the animal litter of the subject invention is usually added to a box or tray, which may be part of the packaging thereof, i.e. prepackaged trays containing a recommended amount of litter. The prepackaged trays may be sold individually or packaged in stacks of several trays. The trays may be of aluminum, paper, plastic, fiberboard, etc., and may come with a releasable adhesively banded cover. The cover may be removed from all edges or from all except a last edge of the tray, and placed beneath the tray. When the litter is to be replaced, the adhesive cover may be replaced and resealed, facilitating transport and disposal.

While an embodiment of the invention has been illustrated and described, it is not intended that the embodiment illustrates and describes all possible forms of the invention. Rather, the words used in the specification are words of description rather than limitation, and it is understood that various changes may be made without departing from the spirit and scope of the invention.

What is claimed is:

1. An animal litter in the form of granules, flakes or both, comprising:
    a milled wood material;
    a milled paper material;
    a moisture-absorbing surfactant being of 1 to 5 percent by weight of the animal litter; and
    a bentonite intermixed with the milled wood and paper materials and the surfactant to form the animal litter, the bentonite being of 20 to 40 percent by weight of the animal litter.

2. The animal litter of claim 1 in the form of granules with at least 90 percent of the granules passable to a ¼ inch mesh sieve.

3. The animal litter of claim 2 having a bulk density of 16 to 24 pounds per cubic feet.

4. The animal litter of claim 1 in the form of flakes with at least 90 percent of the flakes passable to a ⅜ inch mesh sieve.

5. The animal litter of claim 4 having a bulk density of 13.5 to 17.5 pounds per cubic feet.

6. The animal litter of claim 1 further comprising an additive selected from the group consisting of an odor control agent, a binding agent, an acid, a coloring agent, and combinations thereof.

7. The animal litter of claim 6, wherein the additive includes guar gum present in an amount ranging from 7 wt. % to 12 wt. % of the litter.

8. The animal litter of claim 6 further comprising a kaolen clay.

9. The animal litter of claim 1, wherein the milled wood material includes a sawdust, a wood shaving, or both.

10. The animal litter of claim 1, wherein the milled paper material includes shredded newspaper with at least 90 percent of the shredded newspaper being less than ¾ inches in length.

11. The animal litter of claim 1, wherein the milled wood and paper materials comprise 50 to 60 percent by weight of the litter.

12. An animal litter in the form of granules, flakes, or both, comprising:
    a milled paper material and a milled wood material in a combined amount of 40 to 75 percent by weight of the litter;
    a bentonite intermixed with the milled paper and wood materials; and
    guar gum present in an amount ranging from 7 wt. % to 12 wt. % of the animal litter intermixed with the milled paper and wood materials.

13. The animal litter of claim 12 further comprising a surfactant present on the milled wood material in an amount ranging from 1 to 5 percent by weight of the litter and is adapted to increase the milled wood moisture absorption rate.

14. The animal litter of claim 12, wherein the milled paper material includes shredded recycled newspaper.

15. The animal litter of claim 12 further comprising an additive selected from the group consisting of a surfactant, an odor control agent, a binding agent, an acid, a coloring agent, and combinations thereof.

16. An animal litter, comprising:
- a milled cellulosic material present in an amount ranging from 40 wt. % to 75 wt. % of the litter;
- a bentonite present in the amount ranging from 20 wt. % to 40 wt. % of the litter and being intermixed with the milled cellulosic material; and
- a guar gum present in the amount ranging from 5 wt. % to 15 wt. % of the litter and being intermixed with the milled cellulosic material and the bentonite, wherein the guar and bentonite in combination are adapted to reduce the amount of guar gum needed to cause clumps to less than 10 wt. %.

17. The animal litter of claim 16, further comprising a surfactant present on the milled cellulosic material in an amount ranging from 1 wt. % to 5 wt. % of the litter.

18. The animal litter of claim 17, wherein the surfactant is adapted to increase the milled cellulosic material moisture absorption rate.

19. The animal litter of claim 18, wherein the milled cellulosic material comprises a milled wood material.

20. The animal litter of claim 18, wherein the milled cellulosic material comprises a milled paper material.

21. The animal litter of claim 18, wherein the milled cellulosic material is present in an amount ranging from 45 wt. % to 70 wt. % of the litter.

22. The animal litter of claim 18, wherein the milled cellulosic material is present in an amount ranging from 50 wt. % to 60 wt. % of the litter.

23. The animal litter of claim 18, wherein the guar gum is present in an amount ranging from 9 wt. % to 11 wt. % of the litter.

24. The animal litter of claim 18, wherein the surfactant is polyoxyalkylene glycol.

* * * * *